United States Patent [19]
Johannes

[11] 3,980,607
[45] Sept. 14, 1976

[54] POWDERED COATING MATERIALS

[75] Inventor: Gerhard Johannes, Taunusstein, Bleidenstadt, Germany

[73] Assignee: Hoechst Aktiengesellschaft, Frankfurt, Germany

[22] Filed: July 1, 1974

[21] Appl. No.: 485,016

Related U.S. Application Data

[63] Continuation of Ser. No. 324,982, Jan. 19, 1973, abandoned.

[30] Foreign Application Priority Data

Jan. 22, 1972   Germany............................ 2203024

[52] U.S. Cl............................................. 260/37 EP
[51] Int. Cl.² ........................................... C09D 5/00
[58] Field of Search ............................... 260/37 EP

[56] References Cited
UNITED STATES PATENTS

| | | | |
|---|---|---|---|
| 3,770,848 | 11/1973 | Labona et al. .................. | 260/37 EP |
| 3,819,564 | 6/1974 | Gindrup et al. ................. | 260/37 EP |
| 3,842,141 | 10/1974 | Fetscher et al. ............... | 260/824 EP |
| 3,860,557 | 1/1975 | Millar et al. .................... | 260/37 EP |

*Primary Examiner*—Lewis T. Jacobs
*Assistant Examiner*—S. M. Person
*Attorney, Agent, or Firm*—Littlepage, Quaintance, Murphy & Dobyns

[57] ABSTRACT

A process for the manufacture of a powdered coating material having a basis of hardenable synthetic resins, hardeners and pigments selected from the group consisting of metals, metal alloys, and mica for coatings with a metallic appearance wherein the single components are mixed in a finely divided state under an atmosphere of a protective gas and wherein the mixture is plasticized, under homogenization, at a temperature at which the viscosity of the synthetic resin is higher than the drop viscosity, but at most sufficiently high as to guarantee the flow, is homogenized by shearing stress and transformed into a powdered state, a powdered coating material prepared by said process and an article being coated with said coating material.

6 Claims, No Drawings

POWDERED COATING MATERIALS

This is a continuation of application Ser. No. 324,982, filed Jan. 19, 1973 now abandoned.

This invention relates to improvements in or relating to powdered coating materials.

Heat-curable powdered coating materials may be prepared which are based on solid synthetic resins, such as epoxy resins (prepared from bisphenol A and epichlorhydrin and amine, anhydride or $BF_3$ hardeners), polyester resins (prepared from, for example, hydroxyl-group-containing polyalkylene terephthalates and carboxyl-group-containing, sometimes polymeric, hardeners), polyurethanes (prepared from hydroxyl-group-containing polymers or polycondensates by reaction with masked aliphatic or hydroaromatic — sometimes polymeric — isocyanates) or acrylate resins (prepared as self-cross-linking or externally cross-linking resin systems) together with auxiliary concentrates (to improve wetting of the object to be coated and the flow of the coating) and metal pigments based on aluminium, copper or brass.

The manufacture of such powdered coating compositions additionally containing metal pigments may be carried out in such a manner that into a prepared powder based on the above synthetic resin systems, there are incorporated subsequently by mixing, metallic pigments, possibly in an atmosphere of inert gas.

A procedure may be followed in which the metallic pigment is 'sintered-on' to the powder in heated rotating containers at slightly elevated temperatures.

These very carefully controlled treatments are necessary beause metallic powder, especially on the basis of aluminium, is itself so sensitive to pressure that the particles are destroyed and grey coatings are formed which no longer have a metallic reflection. For this reason, aluminium pigments especially have hitherto frequently been stirred carefully into liquid coating compositions, for example at the end of manufacture.

According to the present invention there is provided a process for the manufacture of a powdered coating material having a basis of hardenable synthetic resins, hardeners and pigments selected from metals, metal alloys and mica for coatings with a metallic appearance wherein the single components are mixed in a finely divided state under an atmosphere of a protective gas and wherein the mixture is plasticised at a temperature at which the viscosity of the synthetic resin is higher than the drop viscosity, but at most sufficiently high as to guarantee the flow, is homogenised by shearing stress and transformed into a powdered state. The coating material may also contain further conventional additives.

The expression "metallic pigment" as used below includes metal alloys and also mica, possibly in combination with titanium dioxide, as pigment with metallic effect. The expression "protective gas" indicates those gases which under the processing conditions are inert to the mixture components. Suitable protective gases include nitrogen and carbon dioxide. The plasticizing temperature for the mixture, especially for the processing of a mixture based on an epoxy resin, may be e.g. 110° to 140°C.

Plasticisation can be carried out continuously preferably in the extruder, or discontinuously, for example in an enclosed kneader, always at a melt viscosity as low as possible. This means that during plasticisation, the resin must have a melt viscosity which ensures that it does not drip off vertical surfaces; in other words, the viscosity must be greater than the drop viscosity. By adjusting temperature and viscosity of the resin melt, the processing conditions can be varied. During homogenisation, there also occurs, apart from increased temperatures (from 100° to 160°C), shear forces which, in turn, may give rise to local heating. The shear forces should be only so large that the reflective power of the metallic pigments is not essentially affected. The permissible shear force must possibly be determined by a preliminary experiment. It depends, for example, upon the mixing rate, for example the rotation velocity of the screw, the metering rate and the temperature, especially of the mixing vessel or device. The preliminary experiment can, for example, be so arranged that the conditions of the apparatus are kept constant but the temperature is changed. The optimum plasticisation and homogenisation period, this-in the continuous process-is the dwell time in the extruder, must be independently established in each case. Usually, it is only a few, e.g. 1 to 3 minutes, but it may also be shorter. However, in any case it must be ensured that a homogenous melt is formed. In addition, care must be taken that the starting temperature of the hardener, which may vary in accordance with the nature of the hardener (these are always heat curable synthetic resin systems but not necessarily heat curable synthetic resins, for example in the case of novolak and the mixture with hexamethylenetetramine) is not significantly exceeded.

The conversion of the homogenised mixture into the powdered coating material is generally carried out in such a manner that the melted mixture is cooled, subsequently ground coarsely and, possibly with grading, ground finely or screened.

The powdered coating compositions are particularly suitable for application to metals but may also be applied to other materials whose softening points are significantly above the processing temperature of the powders usually from 200° to 220°C, such as glass, ceramic and porcelain.

Against expectations, a powdered coating composition is obtained in accordance with the invention which, after application by the electrostatic powder spray process in known manner, using a direct voltage of 40 to 150 KV and a compressed air of 0.3 to 5 atg, or by the whirl sinter process, gives a coating with good metallic reflection after stoving in known manner.

According to the invention, the reflection capacity, for example of the aluminium pigments, in the powdered coating compositions is maintained in spite of the forces that arise during plasticisation and homogenisation because the amount of pigment whose reflective capacity is destroyed through deformation during plasticisation can be neglected.

It should be noted that not all known metallic pigment types have such characteristics that no essential impairment of reflection occurs under the operating conditions described. In this respect, the purity of the metals, which in the case of aluminium is more than 99 per cent, as well as the nature of the chemical auxiliaries used for the preparation of the metallic pigments, is of vital importance. For this reason, the suitability of a metallic pigment must be established in preliminary experiments.

It is for example possible to use the metallic pigments in combination with at least one plasticiser, for example on the basis of phthalates, sebacates or adipates, such as $C_8$ to $C_{10}$ phthalates, dicyclohexylphthalates, dioctylsebacate, diisodecyladipate, or stearic acid. Preferably, the metallic pigments are enveloped with these auxiliaries.

The advantages of the process according to the invention are based on the envelopment of the pigment with synthetic resins which results in the following technical improvements:

1. Greatly reduced corrosion through atmospheric factors so that greying is less.
2. No differential migration rate of the powder base and the metallic pigment in the electric field.
3. Elimination of the danger of explosion present during spraying in that the metallic pigment is enveloped with synthetic resin in the plastic state.
4. Very little metallic abrasion if the surface of the coating is damaged.
5. No "bronzing", that is to say change in reflection, for example through grease from finger prints.
6. Improved over-coating properties compared with powder lacquers in which the metallic powder has been incorporated only physically.
7. Application of the metallic effect coating by the one-coat process. With previous processes, the metallic effect was possible only with a multi-coat system.

In the process in accordance with the invention, metallic pigments of a variety of types can be used. By metallic pigments, fine-particled to coarse-particled metallic or mica platelets generally of a size of up to 5 mm are understood, which are usually comminuted in coarse and subsequently in fine crushers and are later polished by means of suitable chemical agents, the metals being enveloped with these agents. As pigments "giving a metallic effect", metallic pigments like aluminium, copper and copper zinc alloys (gold bronze), moreover mica, possibly in combination with titanium dioxide are especially suitable for mixing with powder lacquers, these pigments being present either on their own or in admixture. The amount of these pigments depends upon the desired effect and is generally 1 to 30, preferably 3 to 12, per cent by weight of the powdered coating compositions.

As binder components of the powdered coating compositions conventional, such as the above-named products, especially epoxy resins, alkyd melamine precondensates and binder combinations, are suitable.

Of course, conventional additives can also be incorporated, for example those that have a favourable influence upon wetting and/or the flow during film formation and/or the plasticity of the coating or the electrical characteristics such as the conductivity of the powered coating composition but also its anti-static properties. In detail, conventional additives such as polyacrylates (for example Modaflow; of Monsanto), low to high viscosity, possibly modified, silicone oils, silicone greases, liquid to pasty plasticisers, for example the above-named, wetting agents such as anion- or cation-active, or non ionic substances, for example fatty alcohol sulphonates, alkylene oxide adducts and anti-statics, for example based on polyethylene glycol fatty alkyl ethers, are suitable.

The term "fine particled" is not meant to indicate that the individual components are present in the same particle size but is meant to indicate solely that these are used in comparatively small particles; for example, the resin can have a grain size of up to 5 mm especially 1–5 mm. In general, a mean grain size of 1 to 2 mm is desirable but not necessary. The additives, whose amount in the powdered coating composition is only subordinate, must however have an essentially lower particle size so that their homogenous distribution in the resin base is ensured. The particle thickness of hardener and possibly also of further additives is therefore generally between 1 and 50 $\mu$. This is also the preferred range of the pigments. The process in accordance with the invention can be carried out batchwise or preferably continuously.

In the examples following, parts and percentages are by weight.

EXAMPLE 1

The following formulation is mixed in a closed, rapidly rotating mixer with simultaneous introduction of nitrogen at first for 1 minute at 800 rpm (rotations per minute) and subsequently for 30 seconds at 1,600 rpm. 85.2 parts of a coarse-ground solid epoxy resin based on diphenylolpropane and epichlorhydrin with a softening point according to Durrans of 93° to 104°C, and epoxy equivalent weight of 875 to 1000, a viscosity of 430 to 630 cP in 40 per cent solution (measured in ethylene glycol dibutylether at 25°C), 4.0 parts flow agent concentrate consisting of the above named epoxy resin and a polyacrylate (Modaflow; producer Monsanto) in a weight ratio 9 : 1, 6.0 parts of an aluminium pigment (Standart Feinschliff Aluminium RT; producer: Eckart-Werke, Fürth) and 4.8 parts fine-particled dicyanodiamide (Typ EH of Süddeutsche Kalkstickstoffwerke) are mixed with one another in a closed mixer in an atmosphere of nitrogen. The mixture is plasticised and homogenised in a Buss - Ko kneader Pr 46 (manufacturer: Buss AG, Bale, Switzerland), under the following conditions. Screw temperature: 135°C, casing, discharge part, temperature: 140°C; nozzle temperature: 140°C; temperature of the melted, homogenised mixture: 140°C; metering screw speed: 17.5 rpm; kneader screw speed: 48 rpm; metering screw load: 1.1 amps; kneading screw load: 2.6 amps: nozzle heating load: 1.25 amps; nozzle heating setting: mark 7–8.

In place of a screw, a kneader provided with impellers or the like is also suitable as a mixing device.

The molten, homogenised mixture is discharged on a cooling belt and ground coarsely in known manner, for example in a knife mill (maximum grain size 4–5 mm). Subsequently, the fine grinding is carried out either with simultaneous grading or subsequent screening. The maximum grain sizes of the composition formed are between 80 and 100 micron. The powdered coating composition is processed in a plant suitable for the electrostatic powder spray process at a negative voltage of 60 kV to give coatings which are stoved e.g. at 200°C for ten minutes or at 180°C for 30 minutes.

Instead of using the powder spray process, the powdered coating composition can also be processed into coatings by other electrostatic application methods or by whirl sintering. When processing with whirl sintering, a larger grain size of the powdered coating composition is necessary, in general up to 300 to 400 micron, in order to keep dust development as low as possible. The coatings then have a different coat thickness, of course.

There are generally no adverse effects with any of the application methods. The coatings obtained in accordance with Example 1, at a coat thickness of approximately 80 micron, have the following characteristics: Erichsen cupping (DIN 53156): 8–9 mm; lattice cut (DIN 53151): Gt 0; flow: Grade 1.5 (DIN 53230): gloss measurement (B. Lange): 105 per cent; acetone test: 1 (grade according to DIN 53230); surface hardness (scratch strength): 0 (grading according to DIN 53230); impact cupping: 800–900 mm (determined by means of a descending hammer with a weight of 1.87 kg whose impact surface is designed hemipherically and has a diameter of 20 mm.

EXAMPLE 2 a. Manufacture is effected as in Example 1. Instead of 6% aluminium powder, 7 or 9% are used. The difference in the formulation is compensated for in the case of the epoxy resin and epoxy resin hardener in the ratio used in Example 1.

b. Manufacture is effected as in Example 1. Instead of Standart Feinschliff Aluminium RT, Alcoa Extra Fine Lining Powder 422 is used (Manufacturer; Alcoa Germany GmbH).

c. Manufacture takes place as in Example 1. Instead of Standart Feinschliff Aluminium RT, Alcoa Standard Varnish Powder 322 is used (Manufacturer: Alcoa Germany GmbH) but in an amount of 5%.

d. Manufacture is effected as in Example 1. Instead of Standart Feinschliff Aluminium RT, Alcoa Standard Lining Powder 408 is used (Manufacturer: Alcoa Germany GmbH). The amount of aluminium powder can be increased in Examples 2a to 2d, as mentioned in Example 2a, for example to 10%.

EXAMPLE 3

In a mixer, 93 parts of a polyester resin based on 41 per cent terephthalic acid, 33 per cent trimellitic anhydride, 16 per cent trimethylolpropane and 10 per cent 1,3-propanediol are mixed together with 7 parts of a copper zinc alloy as metallic pigment is an atmosphere of nitrogen as inert gas. The mixture is then transferred into an extruder at 48 rpm and a casing temperature of 140°C and plasticised and homogenised therein. The comminution of the mixture and the application of the powdered coating material obtained from it are carried out as in Example 1.

The coating applied at a coating thickness of 60 $\mu$ is stoved for 30 minutes at 190°C. A coating with good coating properties and metallic appearance is obtained.

EXAMPLE 4

Manufacture is carried out as in Example 3 but with copper pigment in place of the copper zinc alloy. The 50 $\mu$ thick coating obtained has good coating properties and a metallic, copper-coloured appearance.

EXAMPLE 5

Manufacture is carried out as in Example 3 but in place of the copper zinc alloy, a mica-containing titanium dioxide is used as pigment. In this case, too, a 60 $\mu$ thick coating with good coating properties and metallic appearance is obtained.

The physical properties of the samples obtained according to Examples 3 to 5 are summarised in the following table. For the testing of the samples, the films supplied were stoved for 30 minutes at 190°C.

TABLE

| Sample according to Example | 3 | 4 | 5 |
| --- | --- | --- | --- |
| Erichsen cupping (mm) (DIN 53156) | 8.2 | 5.0 | — |
| Lattice cut (DIN 53151) | 0 | 0 | 0 |
| Gloss according to Lange (%) | 83 | 94 | 85 |
| Flow (assessment according to DIN 53230) | 1 | 1 | 1 |
| Descending hammer test (direct) cm | 30+ | 20+ | 10− |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for producing a powdered fusible coating material comprising the steps of:
    1. mixing under a protective gaseous atmosphere a mixture comprising finely divided particles of:
        A. a hardenable synthetic resin selected from the group consisting of epoxy resins, alkyd melamine precondensates, polyester resins, polyurethane resins, acrylic resins and mixtures thereof wherein the synthetic resin has a particle size up to 5 mm
        B. a hardener for said hardenable synthetic resin having a particle size in the range of 1 to 50 $\mu$
        C. a pigment selected from the group consisting of aluminum, copper, copper-zinc alloy, mica and a mixture of mica and titanium dioxide having a particle size of 1 to 50 $\mu$ and being present in an amount equaling 1 to 30 percent by weight of the mixture
        D. a flow agent selected from the group consisting of polyacrylates, silicone oil, silicone greases and plasticizers
    2. plasticising the mixture at a temperature of 100°C to 140°C to produce a viscous plasticised mixture, and
    3. homogenizing the plasticised mixture at a temperature of 100° to 160°C under shearing forces to produce a powdered fusible coating material.

2. The process of claim 1 wherein the hardenable synthetic resin is selected from the group consisting of an epoxy resin of diphenylolpropane and epichlorohydrin, a polyurethane, a polyester of terephthalic acid and trimellitic anhydride, a polyacrylate and mixtures thereof and wherein a plasticiser is used selected from the group consisting of $C_8$ to $C_{10}$ phthalates, dicyclohexyl phthalates, dioctylsebacate, diisodecyladipate and stearic acid, and the mixture consists of 3 to 12 percent by weight of pigment.

3. The process of claim 1 wherein the pigment is aluminum.

4. A process as claimed in claim 1 wherein the shearing stress is controlled by at least one of (a) agitation velocity, (b) feeding velocity and (c) apparatus temperature of the processing apparatus.

5. A process as claimed in claim 1 wherein the process is performed continuously.

6. A process as claimed in claim 1, wherein the average particle size of the synthetic resin is between 1 and 5 mm.

* * * * *